US006453213B1

(12) United States Patent
Hong

(10) Patent No.: US 6,453,213 B1
(45) Date of Patent: Sep. 17, 2002

(54) ROBOT CONTROL SYSTEM AND METHOD

(75) Inventor: Sung-jin Hong, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/851,136

(22) Filed: May 9, 2001

(30) Foreign Application Priority Data

Dec. 6, 2000 (KR) ............................................ 00/73916

(51) Int. Cl.$^7$ .............................................. G06F 19/00
(52) U.S. Cl. ...................... 700/245; 700/254; 700/246; 700/248; 700/255; 700/257; 700/260; 318/568.13; 318/568.14; 318/568.16; 318/568.18; 318/568.21; 318/568.24; 219/86.41; 219/109; 219/124.34; 219/117.1; 219/125.11
(58) Field of Search ................................ 700/245, 255, 700/246, 248, 249, 251, 253, 254, 259, 260, 257; 318/568.13, 568.14, 568.16, 568.11, 568.18, 568.21, 568.24; 219/86.41, 91.1, 109, 61, 124.24, 117.1, 125.11; 901/42, 49, 50; 709/219, 128, 246; 701/23

(56) References Cited

U.S. PATENT DOCUMENTS

| | | | | |
|---|---|---|---|---|
| 3,888,362 A | * | 6/1975 | Fletcher et al. ............. | 198/394 |
| 3,976,382 A | * | 8/1976 | Westby ........................ | 198/394 |
| 4,305,130 A | * | 12/1981 | Kelley et al. ................ | 198/380 |
| 4,402,053 A | * | 8/1983 | Kelley et al. ................ | 198/380 |
| 4,412,121 A | * | 10/1983 | Kremers et al. ........ | 219/124.34 |
| 4,567,348 A | * | 1/1986 | Smith et al. ........... | 219/124.34 |
| 4,761,596 A | * | 8/1988 | Nio et al. .................... | 700/254 |
| 4,953,081 A | * | 8/1990 | Feal et al. .................. | 710/111 |
| 5,353,238 A | * | 10/1994 | Neef et al. .................. | 702/184 |
| 5,643,478 A | * | 7/1997 | Dillet et al. ........... | 219/130.21 |
| 5,834,916 A | * | 11/1998 | Shimogama et al. .. | 318/568.11 |
| 5,906,755 A | * | 5/1999 | Arasuna et al. .......... | 219/86.41 |
| 6,118,093 A | * | 9/2000 | Hong ..................... | 219/124.34 |
| 6,249,718 B1 | * | 6/2001 | Gilliland et al. ......... | 219/130.4 |
| 6,274,840 B1 | * | 8/2001 | Kanjo ..................... | 219/86.41 |
| 6,282,460 B2 | * | 8/2001 | Gilliland et al. .............. | 29/705 |
| 6,313,427 B1 | * | 11/2001 | Suita .......................... | 219/109 |
| 6,317,688 B1 | * | 11/2001 | Bruckner et al. ............ | 244/3.1 |
| 6,393,046 B1 | * | 5/2002 | Kohli et al. ................. | 375/130 |
| 2002/0010840 A1 | * | 1/2002 | Barroso et al. ............. | 711/141 |

FOREIGN PATENT DOCUMENTS

GB   2 104 652 A   *   3/1983

OTHER PUBLICATIONS

Vavreck et al., An adaptive seam tracker for welding heavy-section aluminum, 1989, IEEE, pp. 658–663.*

* cited by examiner

Primary Examiner—William A. Cuchlinski, Jr.
Assistant Examiner—McDieunel Marc
(74) Attorney, Agent, or Firm—Staas & Halsey LLP

(57) ABSTRACT

A robot control system and method for controlling a robot that performs working on a working path between a specified working start point and a working end point. The robot control system includes an interrupt request signal generating section for generating a signal for requesting change of the working path of the robot, an upper controller for generating an interrupt signal including a specified changed value for changing in real time the working path of the robot in accordance with the interrupt request signal generating section, and a robot controller for controlling in real time the operation of the robot in accordance with the interrupt signal from the upper controller. Thus, the motion of the robot that is working can be changed in real time.

10 Claims, 4 Drawing Sheets

ROBOT CONTROL SYSTEM AND METHOD

BACKGROUND OF THE INVENTION

1. Field of the Invention

The present invention relates to a robot control system and method, and more particularly to a robot control system and method which can control motion of a robot in real time through an upper controller while working of the robot.

2. Description of the Related Art

On the recent industrial spots, diverse kinds of robots are used. Hereinafter, the control of a welding robot will be explained as an example.

As shown in FIG. 4, the conventional welding robot system includes a welding robot 51 for performing a welding operation, a sensing section 57 having a laser vision sensor for sensing a distance between a base metal (not illustrated) and a welding torch (not illustrated) and an image of a welding path, a robot controller 53 for controlling to perform the welding along an accurate path by compensating for an error of the welding path through a motion control of the welding robot 51 based on a sensed signal sampled from the sensing section 57, and an upper controller 55 for the whole control of the welding robot system such as welding-related data process, position control of the welding robot 51, control of additional equipment, etc.

If the upper controller 55 transmits to the robot controller 53 working conditions such as the supplied voltage, distance between the welding torch and the base metal, supplying speed of wire, weaving speed of the welding torch, etc., and a welding start command, the robot controller 53 performs the welding operation by driving the welding robot in accordance with the command from the upper controller 55. The robot controller 53 samples various kinds of sensing information on the welding state provided from the sensing section 57, and controls correction of the present motion of the welding robot by comparatively analyzing the sampled sensing information through a currently commercialized motion tracking algorithm.

According to the conventional welding robot system as described above, once the upper controller 55 gives the working start command to the robot controller along with the working conditions, the motion control of the welding robot 51 during the welding process is performed by the robot controller 53. Thus, it is actually impossible that the upper controller 55 controls the motion of the welding robot during the welding process.

Accordingly, although a user serves to monitor the whole welding robot system through the upper controller 55, the improvement of unity and suitability in controlling the whole welding robot system cannot be effected through the motion control during the welding process.

Meanwhile, in case that any dangerous object that may collide the welding robot exists during working or the motion of the robot should be changed for a particular reason in the general robot control system having a robot controlled by the upper controller 55 and the robot controller 53, it is also impossible to change the path of the robot during its working operation in the same manner as the welding robot system.

SUMMARY OF THE INVENTION

Therefore, an object of the present invention is to provide a robot control system and method which can control the motion of a robot through an upper controller during working.

In accordance with the present invention, the above object is accomplished by providing a robot control system for controlling a robot that performs working on a working path between a specified working start point and a working end point, the robot control system comprising an interrupt request signal generating section for generating a signal for requesting change of the working path of the robot, an upper controller for generating an interrupt signal including a specified changed value for changing in real time the working path of the robot in accordance with the interrupt request signal generating section, and a robot controller for controlling in real time the operation of the robot in accordance with the interrupt signal from the upper controller.

Preferably, the robot controller has a built-in program that includes a specified parameter for transmitting/receiving the interrupt signal from the upper controller.

The upper controller and the robot controller may transmit/receive the interrupt signal by a parallel communication method.

Preferably, the interrupt request signal generating section is at least one of a manipulation panel that can be manipulated by a user, a laser sensor, vision sensor, and vision camera.

The robot controller can change the working end point of the working path based on the changed value included in the interrupt signal by controlling in real time the operation of the robot in accordance with the interrupt signal.

In another aspect of the present invention, there is provided a robot control method for a robot control system having a robot that performs working on a working path between a specified working start point and a working end point, an upper controller for receiving various kinds of signals from the outside and controlling as a whole the working of the robot based on the signals, and a robot controller for controlling the operation of the robot in accordance with a command signal from the upper controller, the method comprising the steps of inputting to the upper controller a signal for requesting change of the working path of the robot, the upper controller generating an interrupt signal that includes a changed value of the working path of the robot and transmitting in real time the interrupt signal to the robot controller, and controlling in real time the operation of the robot in accordance with the interrupt signal.

BRIEF DESCRIPTION OF THE DRAWINGS

The above object, and other features and advantages of the present invention will become more apparent after a reading of the following detailed description when taken in conjunction with the drawings, in which.

DETAILED DESCRIPTION OF THE PREFERRED EMBODIMENT

The robot control system and method according to the preferred embodiment of the present invention will be explained with reference to the accompanying drawings.

Figure 1:
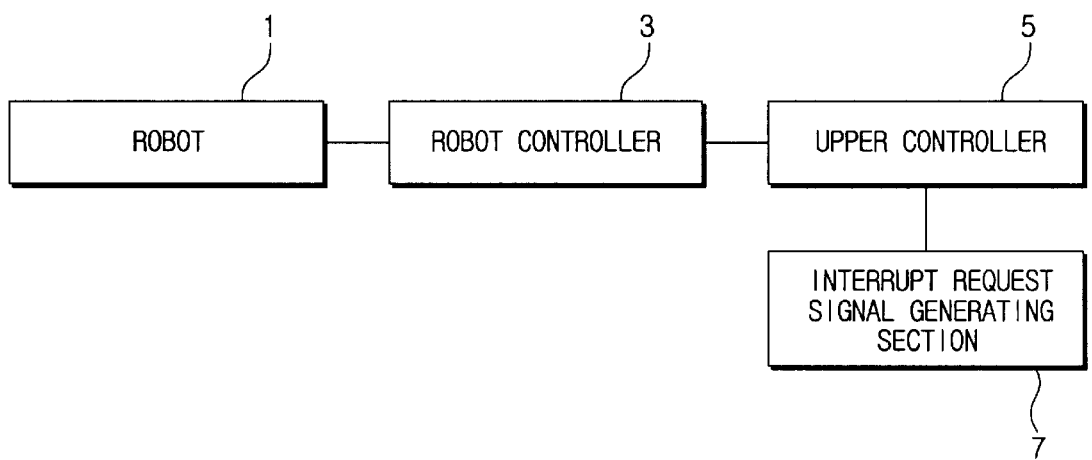
FIG. 1 is a block diagram illustrating the robot control system according to the present invention.

FIG. 1 is a block diagram illustrating the robot control system according to the present invention. Referring to FIG.

1, the robot control system according to the present invention includes a robot 1 for performing working on a working path between a specified working start point and working end point, an upper controller 5 for sampling data in accordance with the basic standard for the path change of the robot 1 and transmitting the sampled data to the robot 1, and a robot controller 3 for controlling the operation of the robot 1 in accordance with a digital input/output (I/O) interrupt signal received from the upper controller 5 so that the position of the robot 1 is changed in real time.

The robot 1 includes all kinds of robots that need the path change such as a welding robot, painting robot, measuring robot, optical component assembling robot, checking equipment robot, etc.

The upper controller 5 changes in real time the path of the robot 1 according to the interrupt request signal inputted from the outside, and transfers the changed path of the robot 1 to the robot controller 3 as the digital I/O interrupt signal. The upper controller 5 may include a PC, PLC, FA controller, master robot controller 3, loop controller, etc. Here, the interrupt request signal from the outside is inputted through the interrupt request signal generating section 7, and the interrupt request signal generating section 7 may be a manipulation panel manipulated by the user, a kind of sensor for generating a signal according to a result of sensing such as a laser sensor, vision sensor, eddy current sensor, vision camera, etc., or both the manipulation panel and the sensor.

The robot controller 3 monitors in real time the signal from the upper controller 5, and an interrupt program having a specified digital interrupt parameter is set in the robot controller 3. Thus, the robot controller 3 can change in real time the operation of the robot 1 in accordance with the digital I/O interrupt signal from the upper controller 5.

The transmission/reception of the digital I/O interrupt signal between the upper controller 5 and the robot controller 3 is performed by a serial communication such as RS-232C, parallel communication mainly used between the I/O device and the controller, or network communication using a LAN. For the above-described communications, the upper controller 5 and the robot controller 3 should have a communication port mounted thereon according to the respective communication type.

RS-232C (Recommended Standard 232 revision C) that is the representative protocol of a serial communication is a widely used industrial interface standard determined by American Electric Industry Societies for connection of a computer to peripheral devices such as a modem. Accordingly, the upper controller 5 and the robot controller 3 should employ a connector, cable, and communication device manufactured according to the RS-232C standard. Since most controllers adopt the RS-232C communication system, it is enough to check whether the robot controller 3 is mounted.

A parallel communication is representatively used for communication between a computer main body and a peripheral device such as a printer. The upper controller 5 and the robot controller 3 are connected by cable using a parallel port supported in the upper controller, and an interface is provided to effect the parallel communication.

A LAN (local area network) is a local area communication network for sharing a plurality of computers located in a relatively small space and a large-capacity storage device connected to the computers, and information can be exchanged at a high speed among the computers connected to the information network by sharing the information built in the computers. In a factory where welding robots are used, the LAN is generally installed, and the upper controller 5 and the robot controller 3 can perform communications with each other using the LAN.

As described above, the upper controller 5 can communicate with the robot controller 3 by adopting one among the three communication types. According to the present invention, the parallel communication type is adopted, and the digital interrupt is transmitted from the upper controller 5 to the robot controller 3.

Generally, the control of a servo motor for the operational control of the robot 1 is performed by the robot controller 3, but the motion control and management of other welding sequence, additional equipment, and auxiliary data are performed by a macro file in the upper controller 5.

Specifically, the upper controller 5 receives vision data of the proceeding working path from a laser vision camera mounted on the robot 1, samples the received vision data, calculates a path error based on the sampled data, and transmits a correction command to the robot controller 3 at predetermined intervals (about 32 msec).

The robot controller 3 reads the correction command transmitted from the upper controller 5, produces a corrected position based on the correction command, and sends the corrected position to a servo controller of the servo motor to track the accurate working path. The transmission interval of the correction command may be different, for example, 32 msec, 64 msec, or 128 msec, in accordance with the environment of the robot control system.

In the robot controller 3, a plurality of working parameters are set, and the user initializes the robot controller 3 by properly designating the parameters to match the purpose and environment of use. According to the present invention, the robot controller 3 receives the digital I/O interrupt signal from the upper controller 5, and the digital interrupt parameter for controlling the operation of the robot 1 is as follows.

1. COMMUNICATION TYPE(0=NOT USED, 1=DIGITAL I/O INTERRUPT)
2. DATA SAMPLING UNIT(0=32 msec, 1=64 msec, 2=128 msec)
3. CORRECTION AMOUNT(0.001 m Unit:0~1000)
4. DATA ACCEPT FEEDBACK(0=NOT USED, 1~32)
5. X coordinate CHANGE:RECEIVE SIGNAL I/O CONTACT (INTERRUPT FOR ROBOT)(-32~32)
6. Y coordinate CHANGE:RECEIVE SIGNAL I/O CONTACT (INTERRUPT FOR ROBOT)(-32~32)
7. Z coordinate CHANGE:RECEIVE SIGNAL I/O CONTACT (INTERRUPT FOR ROBOT)(-32~32)
8. PAUSE SIGNAL RECEIVE SIGNAL I/O CONTACT (INTERRUPT FOR ROBOT)(-32~32)

The COMMUNICATION TYPE (1) is for selecting whether to transmit/receive the digital I/O interrupt signal for changing in real time the path of the robot 1 during communication of the upper controller 5 with the robot controller 3. If 1 is selected, the digital I/O interrupt signal is transmitted from the upper controller 5.

The DATA SAMPLING UNIT (2) is for setting the time interval of data input, and thus should be properly selected according to the robot system environment and the welding working characteristic. If the operation of the robot 1 is controlled in the unit of 32 msec, this time unit is not proper for the operational control of a minute robot. However, in case of the special equipment robot that moves 5~8 mm per second, the correction of position in the range of 0.01~0.05 mm is performed even though any changed value per unit time exists, and thus it can provide a sufficiently precise correction.

The CORRECTION AMOUNT (3) is for designating the changed value during the data sampling, and typically is in the range of about 50~200. At this time, if 0 is selected, the working is performed along the existing path without any change.

The DATA ACCEPT FEEDBACK (4) is for notifying the command reception and result of correction to the upper controller 5 after performing the positional correction according to the command from the upper controller 5. It notifies the result of command performance to the upper controller 5 through an I/O contact selected among 1~32 I/O contacts. (5), (6), (7), and (8) are contact selection regions for defining contacts for bit mapping for connecting the robot controller 3 and the upper controller 5 by hardware in case that the parallel communication is performed between the robot controller 3 and the upper controller 5. (5), (6), and (7) set the interrupt contacts for direction change transferred from the upper controller 5 to move the robot 1 along X, Y, and Z axes, respectively, and have the priority in the order of X, Y, and Z axes. Here, a +(plus) contact means a +(plus) direction, a −(minus) contact means a −(minus) direction, and 0 means no change. If 0 is set in the PAUSE SIGNAL (8), it means no change as a whole. For example, if the contacts of (5), (6), (7), and (8) are 1, 2, 5, and 15, respectively, the X, Y, and Z axes will be changed by communications with the contact numbers 1, 2, and 5, respectively. Also, if the contact number 15 is ON, the robot 1 receives the digital I/O interrupt signal through the contact number 15, and the motion change proceeds as much as the changed value received in the unit of a data input time interval. Accordingly, the path is changed by the digital I/O interrupt signal based on the working start point, and the final working end point is obtained by adding to the working start point the total amount of movement changed by the respective changed values transmitted by the digital I/O interrupt signals.

Figure 2:
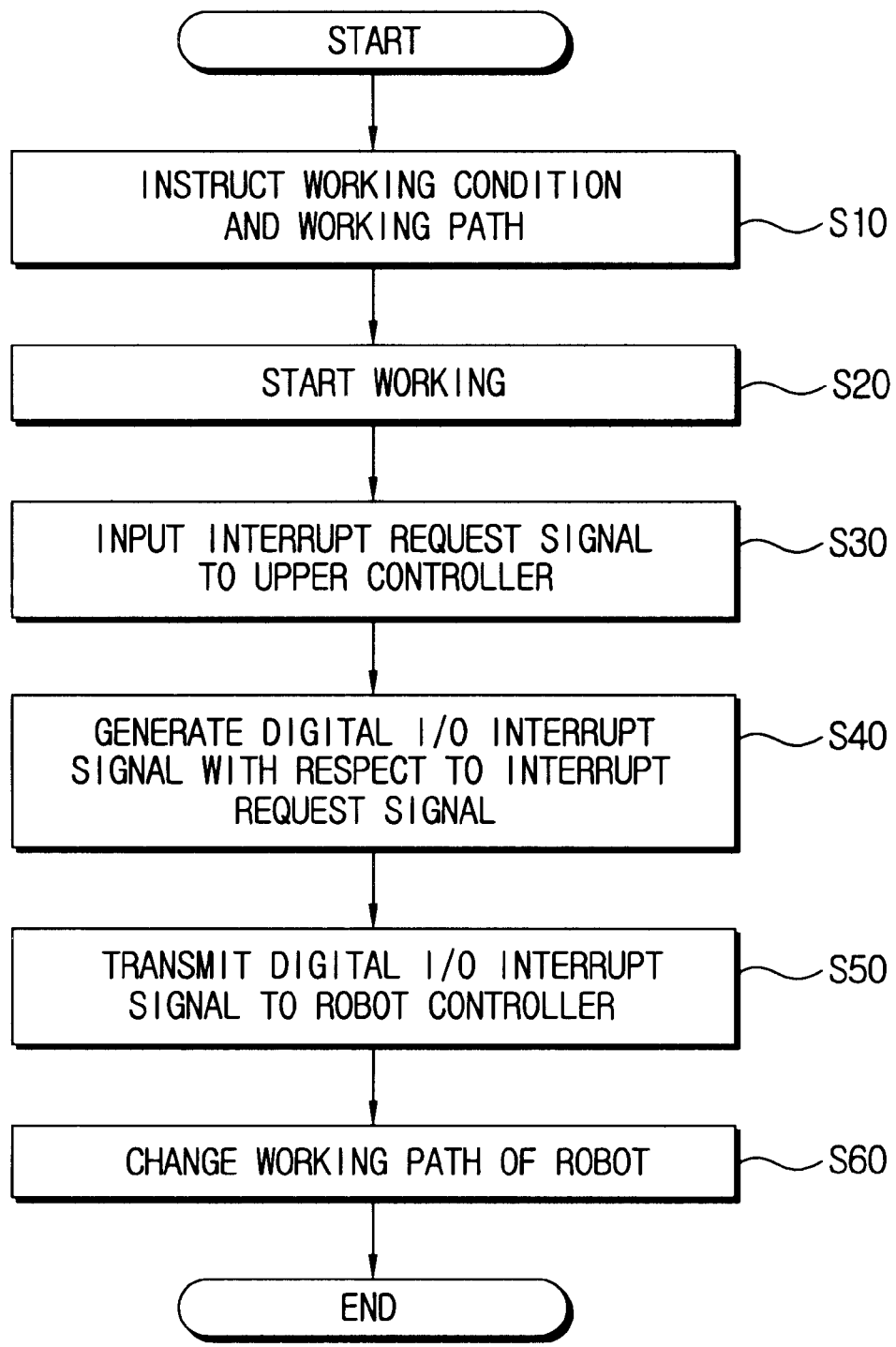
FIG. 2 is a flowchart illustrating the working process performed by the control system of FIG. 1.
Figure 3:
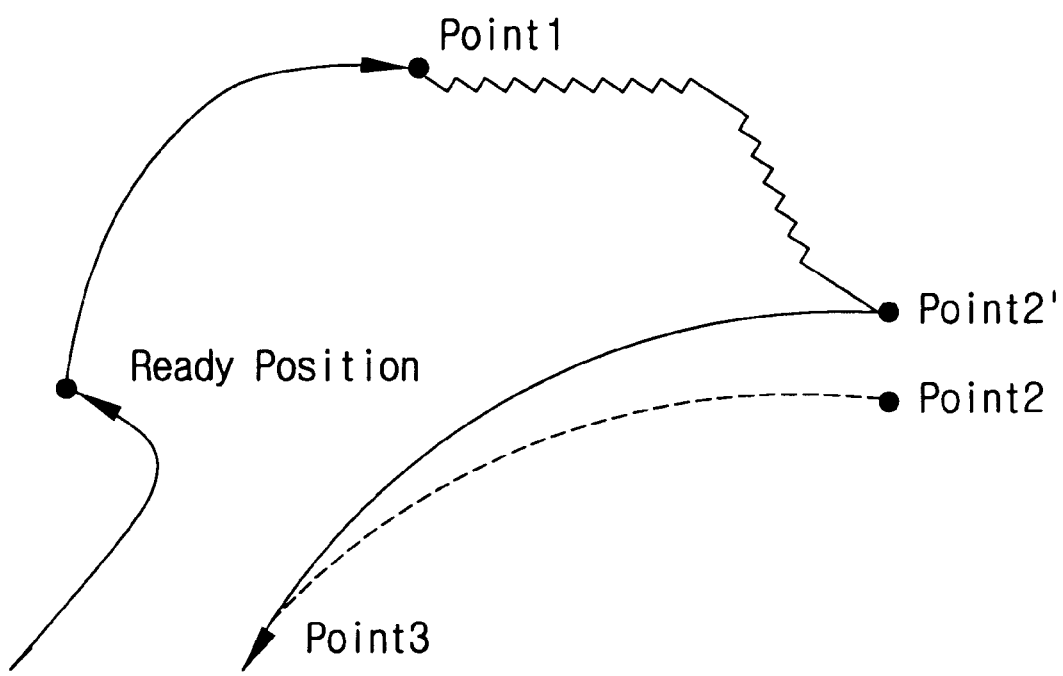
FIG. 3 is a view illustrating the working path effected by the working process of FIG. 2.
Figure 4:
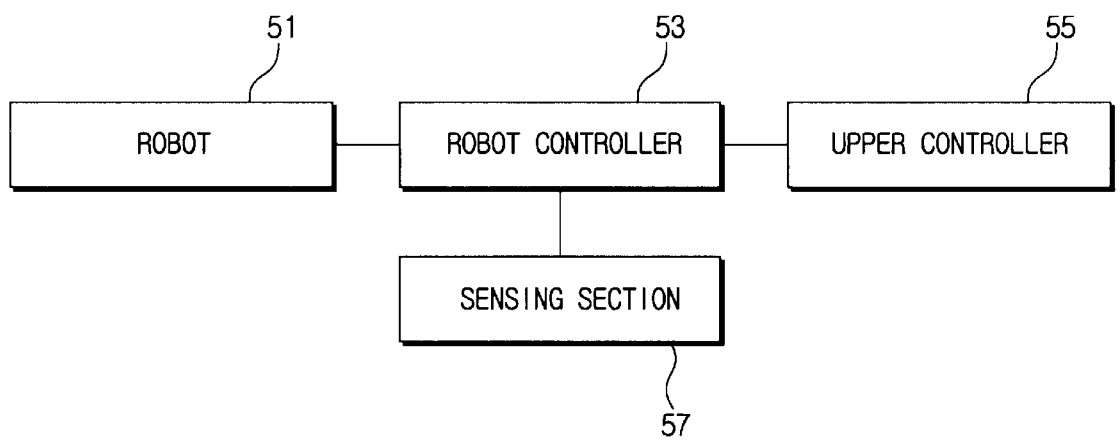
FIG. 4 is a block diagram illustrating the conventional robot control system.

Next, an example of the program installed in the robot controller 3 for changing the path in real time by the digital I/O interrupt signal, and the process of changing the path according to this program will be explained with reference to FIGS. 2 and 3.

READY
MOVE #POINT 1
CMOVES #POINT 2
MOVE #POINT 3
END

Here, #POINT1, #POINT2, AND #POINT3 are specified points on the working path according to the order of working, and their values are determined by the user. If the working condition and working path of the robot 1 are instructed from the upper controller 5 to the robot controller 3 (step S10), the robot controller 3 starts the working according to the program (step S20). Here, the MOVE #POINT1 means the movement of the robot 1 to the working start point, and the CMOVES #POINT2 means the movement of the robot 1 from #POINT1 to #POINT2 as the changed values transmitted by the digital I/O interrupt signal are applied thereto. Specifically, if the interrupt request signal is inputted from the outside to the upper controller 5 (step S30), the upper controller 5 generates and transmits to the robot controller 3 the digital I/O interrupt signal corresponding to the interrupt request signal (steps S40 and S50), and the robot controller 3 receives in real time the digital I/O interrupt signal from the upper controller for the parallel communication, and changes the path of the robot 1 between #POINT1 and #POINT2 (step S60). The change of the robot path is performed several tens of times while the robot moves from the working start point, #POINT1, to the working end point, #POINT2, by the digital interrupt signals. By this path change, the working end point is changed from #POINT2 to #POINT2'. At this time, the working end point may be changed or may be not changed in accordance with the path change since it is determined by the accumulation of the changed values. The MOVE #POINT3 means the movement to #POINT3 after the completion of the working as the robot moves from #POINT1 to #POINT2.

The above-described input parameters and the program built in the robot controller 3 are presented only as an example, and thus proper modifications thereof are possible.

As described above, according to the robot control system according to the present invention, the change of the robot path is performed in real time by the digital I/O interrupt signal from the upper controller 5 during the programmed working. Since the real-time change of the path is possible, the change of the working end point becomes also possible. Thus, the path of the robot can be minutely controlled.

The robot control system and method according to the present invention can be applied to the control of working motion change of an assembling equipment, the control of shading of a painting robot, the control of tracking change of a robot installed in a measuring, assembling, and checking equipment, the control of motion change of a micro robot applied to a biological industry, the real-time control of unit-area motion of an optical component assembling robot, the control of new path creation in a school or research institute, the control of robot motion in a system where a sensor or vision camera is installed, etc.

From the foregoing, it will be apparent that the present invention provides a robot control system that can change the motion of a working robot in real time.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A robot control system for controlling a robot that performs working on a working path between a specified working start point and a working end point, the robot control system comprising:

an interrupt request signal generating section for generating a signal for requesting change of the working path of the robot;

an upper controller for generating an interrupt signal including a specified changed value for changing in real time the working path of the robot in accordance with the interrupt request signal generating section; and a robot controller for controlling in real time the operation of the robot in accordance with the interrupt signal from the upper controller.

2. The robot control system as claimed in claim 1, wherein the robot controller has a built-in program that includes a specified parameter for transmitting/receiving the interrupt signal from the upper controller.

3. The robot control system as claimed in claim 2, wherein the upper controller and the robot controller transmit/receive the interrupt signal by a parallel communication method.

4. The robot control system as claimed in claim 3, wherein the interrupt request signal generating section is at least one of a manipulation panel manipulated by a user, laser sensor, vision sensor, and vision camera.

5. The robot control system as claimed in claim 3, wherein the interrupt request signal generating section is at least one of a manipulation panel manipulated by a user, laser sensor, vision sensor, and vision camera.

6. The robot control system as claimed in claim 2, wherein the interrupt request signal generating section is at least one of a manipulation panel manipulated by a user, laser sensor, vision sensor, and vision camera.

7. The robot control system as claimed in claim 6, wherein the robot controller can change the working end point of the working path based on the changed value included in the interrupt signal by controlling in real time the operation of the robot in accordance with the interrupt signal.

8. A robot control method for a robot control system having a robot that performs working on a working path between a specified working start point and a working end point, an upper controller for receiving various kinds of signals from the outside and controlling as a whole the working of the robot based on the signals, and a robot controller for controlling the operation of the robot in accordance with a command signal from the upper controller, the method comprising the steps of:

inputting to the upper controller a signal for requesting change of the working path of the robot;

the upper controller generating an interrupt signal that includes a changed value of the working path of the robot and transmitting in real time the interrupt signal to the robot controller; and controlling in real time the operation of the robot in accordance with the interrupt signal.

9. The robot control method as claimed in claim 8, wherein the step of transmitting in real time the interrupt signal to the robot controller transmits/receives the interrupt signal by a parallel communication method.

10. The robot control method as claimed in claim 9, wherein the signal for requesting the change of the working path of the robot is generated from at least one of a manipulation panel manipulated by a user, laser sensor, vision sensor, and vision camera.

* * * * *